United States Patent
Gu

(10) Patent No.: US 10,728,813 B2
(45) Date of Patent: Jul. 28, 2020

(54) METHOD AND DEVICE FOR HANDING OVER USER EQUIPMENT AMONG WIRELESS ACCESS POINTS

(71) Applicant: SHANGHAI LIANSHANG NETWORK TECHNOLOGY CO., LTD., Shanghai (CN)

(72) Inventor: Zhengxiang Gu, Shanghai (CN)

(73) Assignee: SHANGHAI LIANSHANG NETWORK TECHNOLOGY CO., LTD., Shanghai (CN)

(*) Notice: Subject to any disclaimer, the term of this patent is extended or adjusted under 35 U.S.C. 154(b) by 19 days.

(21) Appl. No.: 16/126,184

(22) Filed: Sep. 10, 2018

(65) Prior Publication Data
US 2018/0376395 A1 Dec. 27, 2018

Related U.S. Application Data
(63) Continuation of application No. PCT/CN2016/076947, filed on Mar. 22, 2016.

(30) Foreign Application Priority Data
Mar. 11, 2016 (CN) .......................... 2016 1 0139220

(51) Int. Cl.
| | | |
|---|---|---|
| H04W 36/08 | (2009.01) | |
| H04W 36/00 | (2009.01) | |
| H04W 36/18 | (2009.01) | |
| H04W 36/22 | (2009.01) | |
| H04W 84/12 | (2009.01) | |

(52) U.S. Cl.
CPC ....... *H04W 36/08* (2013.01); *H04W 36/0077* (2013.01); *H04W 36/18* (2013.01); *H04W 36/22* (2013.01); *H04W 84/12* (2013.01); *Y02D 70/00* (2018.01)

(58) Field of Classification Search
CPC .. H04B 7/18541; H04B 14/382; H04W 40/36
See application file for complete search history.

(56) References Cited

U.S. PATENT DOCUMENTS

2015/0172985 A1   6/2015 Gangadhar et al.

FOREIGN PATENT DOCUMENTS

| CN | 101605077 A | 12/2009 |
| CN | 104980975 A | 10/2015 |

OTHER PUBLICATIONS

The World Intellectual Property Organization (WIPO) International Search Report for PCT/CN2016/076947 dated Nov. 30, 2016 5 Pages.

*Primary Examiner* — Joshua L Schwartz
(74) *Attorney, Agent, or Firm* — Bayramoglu Law Offices LLC

(57) ABSTRACT

The present application provides a method, network station and user device to switch wireless connection between WAPs. The network station obtains a target WAP for the user device to connect later, determines the access information corresponding to the target WAP, and sends the access information to the user device via current wireless connection between the user device and a currently connected WAP. The user device correspondingly receives the access information corresponding to a target WAP, and establishes wireless connection between the user device and the target WAP according to the access information.

6 Claims, 4 Drawing Sheets

METHOD AND DEVICE FOR HANDING OVER USER EQUIPMENT AMONG WIRELESS ACCESS POINTS

CROSS REFERENCE TO RELATED APPLICATION

This application is a continuation application of PCT Application No. PCT/CN2016/076947, filed on Mar. 22, 2016, which claims priority and benefits of Chinese Patent Application No. 201610139220.1, filed with State Intellectual Property Office on Mar. 11, 2016, the entire content of which is incorporated herein by reference.

BACKGROUND OF THE INVENTION

Field of the Invention

The present invention relates to the computing field, and in particular, to a technology for a user device to switch wireless connection between wireless access points.

Descriptions of the Related Art

With the rapid development of wireless access technology, people's daily lives are becoming more and more inseparable from wireless network. However, due to the limited stability and coverage of each wireless access point (WAP), the wireless connection established with the currently-connected WAP will be off when the currently connected WAP is not stable or when the user device moves out of its coverage. The communication activity currently performed in the user device is therefore disconnected. This causes users inconvenient.

SUMMARY OF THE INVENTION

The object of the present application is to provide a method, network station and user device for a user device to switch wireless connection between WAPs.

According to an embodiment of the present application, a method for a user device to switch wireless connection between WAPs applied to a network station is provided, wherein the method comprises the following steps of:

obtaining a target WAP for the user device to connect later;

determining access information corresponding to the target WAP; and sending the access information to the user device via current wireless connection between the user device and a currently connected WAP, so that the user device is able to establish wireless connection with the target WAP.

According to another embodiment of the present application, a method for a user device to switch wireless connection between WAPs applied to the user device is further provided, wherein the method comprises the following steps of:

receiving access information corresponding to a target WAP which the user device is going to connect via current wireless connection between the user device and a currently-connected WAP; and establishing wireless connection between the user device and the target WAP according to the access information.

According to another embodiment of the present application, a network station for a user device to switch wireless connection between WAPs is further provided, where the network station comprises:

a first apparatus for obtaining a target WAP for the user device to connect later;

a second apparatus for determining access information corresponding to the target WAP; and a third apparatus for sending the access information to the user device via current wireless connection between the user device and a currently-connected WAP, so that the user device is able to establish wireless connection with the target WAP.

According to another embodiment of the present application, a user device is provided to switch wireless connection between WAPs, wherein the user device comprises:

a sixth apparatus for receiving access information corresponding to a target WAP which the user device is going to connect later via current wireless connection between the user device and a currently-connected WAP; and a seventh apparatus for establishing wireless connection between the user device and the target WAP according to the access information.

According to a further embodiment of the present application, a system is provided for a user device to switch wireless connection between WAPs. The system comprises a network station for the user device to switch wireless connection between WAPs, and the user device switching between the WAPs.

In contrast to prior art, the present application provides a network station to obtain a target WAP for the user device to connect later, to determine access information corresponding to the target WAP, and to send the access information to the user device via current wireless connection between the user device and a currently-connected WAP, in order for the user device to establish wireless connection with the target WAP Correspondingly, the user device receives the access information and establishes wireless connection with the target WAP according to the access information. In this way, the automatic switch of the user device from the currently connected WAP to the target WAP is achieved. Besides, the access information is sent in advance via the current wireless connection between the user device and the currently connected WAP. The switching efficiency is hence improved. The user device may perform automatic switching between WAPs on the move. In particular, the present application not only drastically reduces the power consumption of the user devices, but also quit re-building WAPs compared with the technology of switching between WAPs by re-modeling WAPs or user devices. The feasibility of the present application is apparent. Moreover, considering security, privacy, and other factors, a WAP is regularly unable to retrieve the access information of other WAPs. The present application enables user devices to retrieve the access information of the target WAP via a network station. It avoids security issues and expands the application scope of the present application.

Moreover, the present application may also detect whether user devices store the access information, and send the access information to the user devices when the user devices do not store the access information via current wireless connection between the user devices and a currently-connected WAP. The user devices thereby establish wireless connection with the target WAP. The access information comprises any one of the followings: access password information corresponding to the target WAP, access token information corresponding to the target WAR and available connection module information corresponding to the target WAP. In this way, the data transmission loading of the network station can be reduced. For example, the network station does not need to send the access information any more when a user device has stored the access information. In this case, the present application ensures user devices to retrieve corresponding access information when they need to establish connection with a target WAP by detecting whether the user devices have stored the access information in advance. The process does not need the user devices to request the access information. It effectively eliminates the delay in requesting the access information, improves the efficiency of establishing wireless connection, and saves time for establishing connection. It further accomplishes user-senseless WAP switching.

If there is an existing communication activity in the user device via the current wireless connection, the present application may establish wireless connection between the user device and a target WAP after the communication finishes. The communication activities comprise all data transmission activities performed in the user device via the current wireless connection, such as download and upload of text, picture, audio, and video. The present application does not perform the switch of WAPs until the current communication activity is completed. The arrangement is to avoid interruption of the communication activity and then to optimize communication efficiency and user experience.

BRIEF DESCRIPTION OF THE FIGURES

Other features, objects, and advantages of the present application become more apparent upon reading the detailed description of the embodiments with reference to the following figures.

The same or similar reference numbers in the figures represent the same or similar components.

DESCRIPTION OF THE PREFERRED EMBODIMENT

The present application will be further described in detail below with reference to the accompanying figures.

In a typical configuration of the present application, each of terminals, service network stations, and the trusted terminals comprises one or more processors (CPUs), input/output interfaces, network interfaces, and storage components.

The storage components may be non-volatile memory, random access memory (RAM) and/or non-volatile memory of computer-readable media, such as read-only memory (ROM) or flash RAM. The storage components are an example of a computer readable medium.

Computer readable media include permanent and non-permanent, removable and non-removable media which store information in any method or technology. The information can be computer readable instructions, data structures, modules of programs, or other data. Examples of computer storage media comprise, but are not limited to, phase change memory (PRAM), static random access memory (SRAM), dynamic random access memory (DRAM), random access memory (RAM), ROM, EEPROM, flash memory, CD-ROM, DVD, magnetic cassettes, magnetic tape storage, or any other medium that can be used to store information and accessed by a computer. As defined herein, computer readable media do not comprise non-transitory media such as modulated data signals and carriers.

To further elaborate the technical approaches and the effects of the present application, the technical solutions of the present application are clearly and completely described below with reference to the accompanying figures and preferred embodiments.

Figure 1:
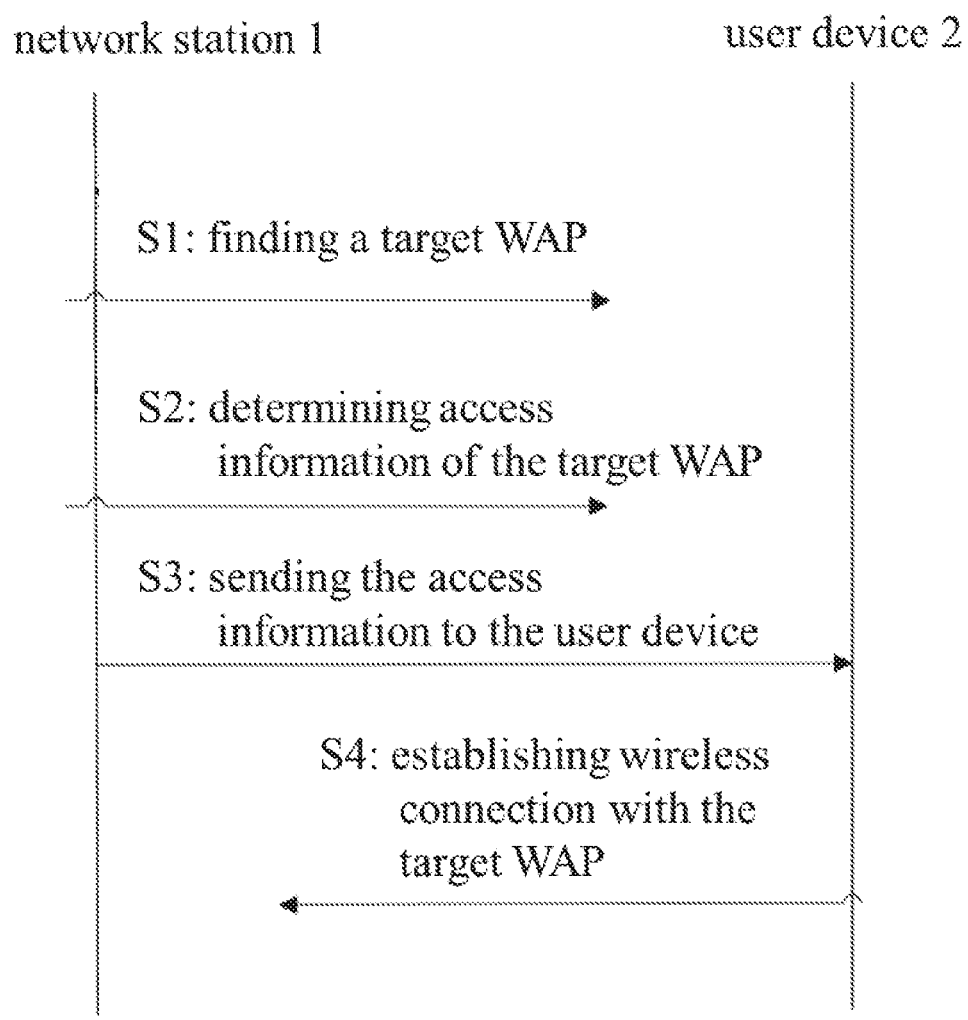
FIG. 1 shows a flow chart of a method for a user device to switch wireless connection between WAPs according to an embodiment of the present application.

FIG. 1 shows a flow chart of a method for a user device to switch wireless connection between WAPs at both of a network station end and a user device end according to an aspect of the present application. The network station 1 cooperates with the user device 2 to complete the switch of the user device 2 between the WAPs. The network station 1 is independent from the user apparatus 2 and the WAPs.

The network station 1 may be but is not limited to a computer, a web host, a single web server, a cloud formed of a plurality of web server sets or servers. The cloud is formed of a large number of computers or network servers which perform cloud computing. The cloud computing is a kind of distributed computing performed by a virtual super-computer composed of a group of loosely coupled computer sets. Preferably, the network station 1 stores relevant information of WAPs. The user device 2 may be various smart devices capable of implementing wireless connection function, such as a smart phone, a tablet and the like. The smart devices are driven with any operating system such as android or iOS.

In step S1, the network station 1 obtains a target WAP for the user device 2 to connect later. In step S2, the network station 1 determines the access information corresponding to the target WAP. In step S3, the network station 1 sends the access information to the user device 2 via the current wireless connection between the user device 2 and the currently connected WAP. The user device 2 is therefore able to establish wireless connection with the target WAP. In this step S3, the user device 2 receives, via the current wireless connection with the currently connected WAP, the access information corresponding to the target WAP sent by the network station 1. In step S4, the wireless connection between the user device 2 and the target WAP is established based on the access information.

In step S1 of this embodiment, the network station 1 obtains a target WAP for the user device 2 to connect later. The WAP is an access point of wireless network which may be, but is not limited to, wireless local area network following the standard protocols IEEE 802.11 series such as WiFi via which the user device 2 can access wireless network. The target WAP refers to a WAP that the user device 2 is going to connect. Specifically, the network station 1 obtains the connection process of the target WAP and the information of the user device 2 to obtain an appropriate target WAP based on preset rules. Preferably, the step S1 further comprises the step of selecting a target WAP according to the moving information of the user device 2, wherein the selection of the target WAP depends on the movement of the user device 2. Those skilled in the art can understand that WAPs are deployed in different geographical locations, and therefore, the selection is according to the geographical location of which WAP that the user device 2 finally moves toward. Preferably, the moving information comprises the moving direction information of the user device 2, the moving speed information of the user device 2, the current location information of the user device 2, and the location information of the currently-connected WAP. According to the moving direction information of the user device 2, the current location information of the user device 2 and the location information of the currently-connected WAP, multiple WAPs whose locations sit in the moving direction of the user device 2 may be selected and one of them closest to the user device 2 is taken as the target switch WAP.

The method further comprises a step S5 to derive the switching time information corresponding to the target WAP. In step S3, the switching time information is also sent to the user device 2 via the current network between the user device 2 and the currently-connected WAP, in order for the user device 2 to establish wireless connection with the target WAP.

In step S5, the network station 1 derives the switching time information corresponding to the target WAP, wherein the switching time information is used to trigger the user device 2 to connect to the target WAR Preferably, in step S5, the switching time information is derived according to the coverage area information of the target WAP and the moving information. More specifically, the entry information reflecting that the user device 2 enters the coverage area of the target WAP may be determined according to the moving direction information of the user device 2, the current location information of the user device 2, and the coverage area information of the target WAR And the switching time information corresponding to the target WAP is determined according to the entry information and the moving speed information of the user device 2. For example, if the distance between the user device 2 and the border of the coverage area of the target WAP is 20 meters and the moving speed of the user device 2 is 5 meters/second according to the moving direction of the user device 2 and the coverage area of the target WAR the corresponding switching time is derived as 4 seconds. In step S3, both of the access information and the switching time information are sent to the user device 2 via the current wireless connection for the user device to establish wireless connection with the target WAP.

In step S2, the network station 1 determines the access information of the target WAR Those skilled in the art can understand that the network station 1 stores a large amount of the access information of WAPs. Therefore, the access information corresponding to the target WAP can be retrieved from the database of the network station 1 when the target WAP is found.

In step S3, the network station 1 sends the access information to the user device 2 via the current wireless connection between the user device 2 and the currently connected WAP for the user device 2 to establish wireless connection with the target WAP. The user device 2 receives the access information. Specifically, before the target WAP is connected to, the information exchange between the network station 1 and the user device 2 is performed via the current wireless connection based on the communication protocol of the current wireless connection. The access information comprises any one of the access password information corresponding to the target WAP, the access token information corresponding to the target WAP, and the available connection module information corresponding to the target WAP. The access information is used to establish wireless connection with the target WAP. Those skilled in the art should understand that different WAPs may correspond to different access approaches. Different access approaches correspond to different available connection module information which decides the access approach of the WAP, such as password authentication, token authentication, or other authentication methods. If the available connection module is not stored in the user device 2, the network station 1 needs to provide the available connection module information and the access information of the target WAR In the condition that the available connection module is already stored in the user device 2, the network station 1 only needs to provide the access information. For example, the WAPs using the password authentication can be connected with the corresponding access password information. The access password information may comprise password information or account number plus password information. Another example is that a WAP, such as some operators' hot spots, using token authentication may be connected based on the corresponding token information, or based on the mobile phone number and the dynamic verification code information, and the like.

Those skilled in the art should understand that the access approach is only exemplary. Other existing or future possible ways of establishing wireless connection with a WAP are applicable to the present application and should fall into in the scope of the present application.

Preferably, the method further comprises a step of detecting, by the network station 1, whether the user device 2 stores the access information. In step S3, the access information is sent to the user device 2 via the current wireless connection between the user device 2 and the currently-connected WAP when the user device 2 does not store the access information, so that the user device 2 is able to establish wireless connection with the target WAP. The network station 1 stores a lot of historical information for establishing connection between user devices and WAPs. Therefore, the access information for the user device 2 to establish wireless connection with the target WAP may be retrieved from the history information. More specifically, the network station 1 detects whether the user device 2 stores the access information by searching whether any data shows that the user device 2 ever established wireless connection with the target WAP in the history information database in the network station 1. For example, the search may be performed according to the serial number corresponding to the user device 2 and the model name of the target WAP. If the user device 2 ever established connection with the target WAP before, the user device 2 then stores the access information of the target WAP. If the user device 2 does not store the access information, the network station 1 sends the access information to the user device 2 via the current wireless connection between the user device 2 and the currently-connected WAP in step S3.

In step S4, the user device 2 establishes wireless connection between the user device 2 and the target WAP according to the access information. Specifically, the user device 2 implements the wireless connection with the target WAP based on the access approach corresponding to the access information after the access information is sent by the network station 1. For example, if the available connection module information of the target WAP is already stored in the user device 2, the user device 2 automatically loads the received access information into a corresponding location based on a preset protocol rule to implement the connection with the target WAP. If there is no available connection module information of the target WAP in the user device 2, the available connection module information needs to be transmitted to the user device 2 to implement wireless connection with the target WAP.

Preferably, in step S4, if there is a communication activity performing in the user device 2 via the current communication connection, the wireless connection between the target WAP and the user device 2 is established according to the access information after the communication activity ends. The communication activity comprises all information transmission activities performed by the user device, such as download and upload of text, picture, audio, and video. The present embodiment may continue to establish wireless connection with the target WAP after the communication activity is completed or ceased. Specifically, the way of not interrupting the current communication activity of the user device 2 may be implemented via a virtual private network (VPN) server. The VPN server assigns a virtual IP to the user device 2 to maintain the communication activity. Moreover, the network station 1 may select an appropriate target WAP for the user device 2 according to the current communication activity. For example, if the user device 2 is performing a communication activity that requires high bandwidth, the network station 1 preferably selects a target WAP with relatively higher bandwidth. If the user device 2 is performing an application requiring high security such as online banking, the network station 1 preferably selects a target WAP with higher security.

Figure 2:
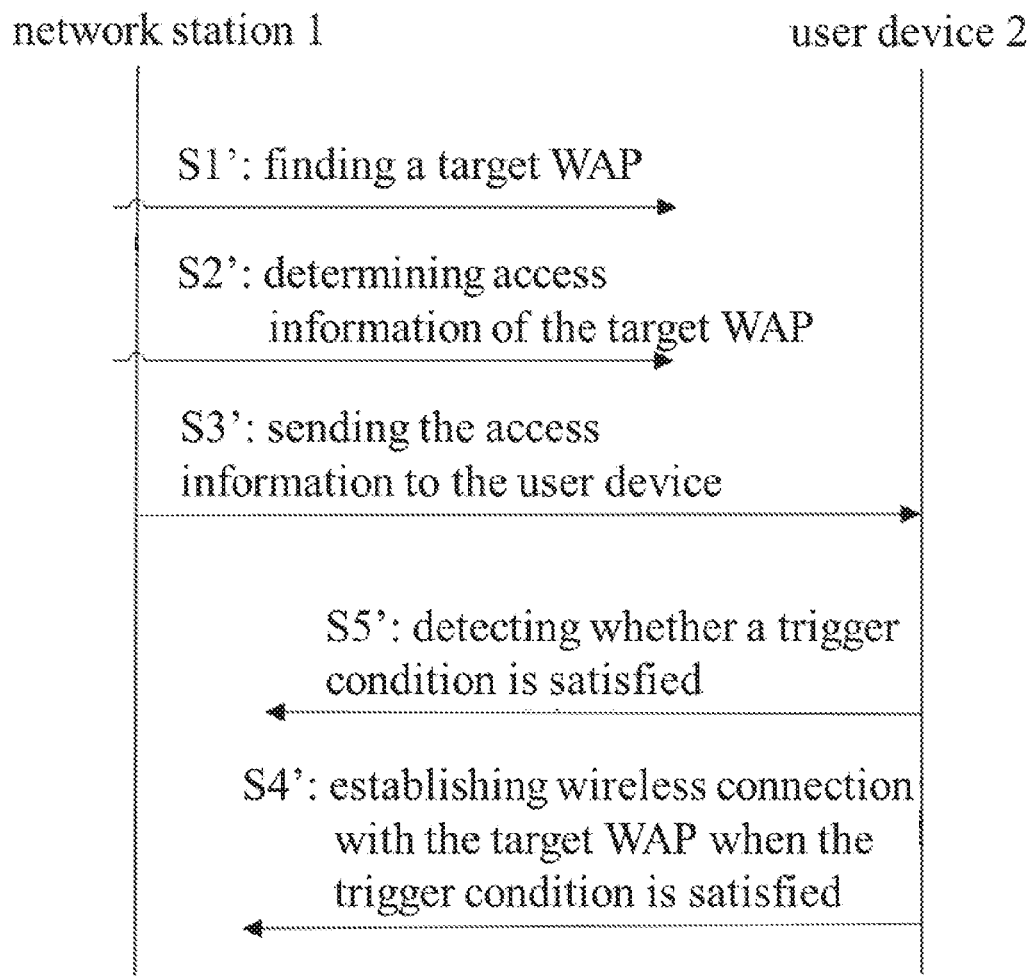
FIG. 2 shows a flow chart of a method for a user device to switch wireless connection between WAPs according to a preferred embodiment of the present application.

In another preferred embodiment as shown in FIG. 2, the steps S1', S2' and S3' in FIG. 2 are the same or substantially the same as the steps S1, S2 and S3 in FIG. 1. They are not be described in detail herein but are simply referred to. The method of this embodiment further comprises a step of S5' that the user device 2 detects whether a trigger condition for connecting to the target WAP is satisfied.

In step S4', the user device 2 establishes wireless connection with the target WAP according to the access information when the trigger condition is satisfied.

In step S5', the user device 2 detects whether the trigger condition for connecting to the target WAP is satisfied, wherein the trigger condition is used to trigger the user device 2 to connect to the target WAR For example, if the signal strength of the currently-connected WAP is weak or the signal strength of the target WAP is strong enough to establish wireless connection, the user device 2 may be triggered to connect to the target WAP. Preferably, the trigger condition may be any one of the followings: the signal strength of the target WAP equal to or greater than a predetermined first signal strength threshold, the signal strength of the currently-connected WAP equal to or less than a predetermined second signal strength threshold, the signal strength of the target WAP equal to or greater than the signal strength of the currently-connected WAP, the switching time information corresponding to the access information being satisfied, and the access information being received by the user device 2.

Specifically, the trigger condition for triggering the user device 2 to establish wireless connection with the target WAP may be any one of the followings: (a) The signal strength of the target WAP is equal to or greater than a predetermined first signal strength threshold, wherein the first signal strength threshold is the lower limit signal strength suitable for establishing wireless connection with a WAP. The lower limit value is preset. When the user device 2 detects that the signal strength of the target WAP is equal to or greater than the predetermined first signal strength threshold, the user device 2 connects to the target WAP. (b) The signal strength of the currently-connected WAP is equal to or less than a predetermined second signal strength threshold, wherein the second signal strength threshold is an upper limit signal strength unsuitable for establishing wireless connection with a WAP. The upper limit value is also preset. When the user device 2 detects the signal strength of the currently-connected WAP is equal to or less than a predetermined second signal strength threshold, the user device 2 connects to the target WAP. (c) The signal strength of the target WAP is equal to or greater than the signal strength of the currently-connected WAP. In this case, the user device 2 compares the signal strengths of the current and the target WAPs. The status that the signal strength of the target WAP is equal to or is greater than the signal strength of the currently-connected WAP indicates that the target WAP is more suitable for establishing wireless connection. (d) The switching time of the access information is satisfied. In this case, the user device 2 has received the switching time calculated by the network station 1, and the connection switch is triggered when switching time is up. (e) The network station 1 informs the user device 2 of the switch. The user device 2 receives the access information. Those skilled in the art may understand that the network station 1 may calculate and monitor the switching time. When the switching time is up, the network station 1 sends the access information to the user device 2 to enable the wireless connection between the user device 2 and the target WAP. Alternatively, the network station 1 and the user device 2 agree on the switching time in advance. After the user device 2 receives the access information, the user device 2 switches to the target WAP when the agreed switching time is up.

In contrast to prior art, the present embodiment illustrates that the network station obtains a target WAP for a user device to connect, determines the access information corresponding to the target WAP, and sends the access information to the user device via current wireless connection between the user device and the currently-connected WAP. The user device therefore may establish wireless connection with the target WAP. Correspondingly, the user device receives the access information, and establishes wireless connection with the target WAP according to the access information. In this way, automatic connection switch from the currently connected WAP to the target WAP is achieved. The access information is sent in advance via the current wireless connection between the user device and the currently-connected WAP. The switching efficiency is improved. User devices may achieve automatic connection switch between WAPs especially on the move. In particular, compared with the connection switch technology by re-modeling WAPs or user devices, the present embodiment drastically reduces the energy consumption of the user devices, and ensures the feasibility of the implementation of the present embodiment. Moreover, due to security or privacy and other considerations, a WAP is usually unable to retrieve the access information of another WAR The network station of the present embodiment performs the transmission of the access information. It avoids the potential safety hazard and also expands the scope of application.

Moreover, the present embodiment may also detect whether the user device stores the access information. When the user device does not store the access information, the access information is sent to the user device via the current wireless connection, so that the user device establishes wireless connection with the target WAP. The access information comprises any one of the followings: the access password information corresponding to the target WAR the access token information corresponding to the target WAP, and the available connection module information corresponding to the target WAP. The amount of data transmission in the network station can be reduced thereby. For example, when the user device stores the access information, the network station does not need to send the access information any more. The embodiment detects whether the user device stores the access information of the target WAP in advance to ensure that the user device has retrieved the access information when it needs to establish connection with the target WAP without the user device requesting the access information. It has advantages of eliminating the delay resulting from requesting the access information, improving the efficiency of establishing wireless connection, saving time for establishing connection, and implementing user-senseless WAP switch.

If there is an existing communication activity in the user device via the current communication connection, the embodiment may start to establish wireless connection between the user device and the target WAPs after the communication activity finishes. The communication activities comprise all data transmission activities performed by the user device via the current wireless connection, such as download and upload of text, picture, audio, and video. The present embodiment may start to perform the switch of WAPs after the current communication activity is completed. The arrangement is to avoid interruption of the communication activity and to optimize communication efficiency and user experience.

Figure 3:
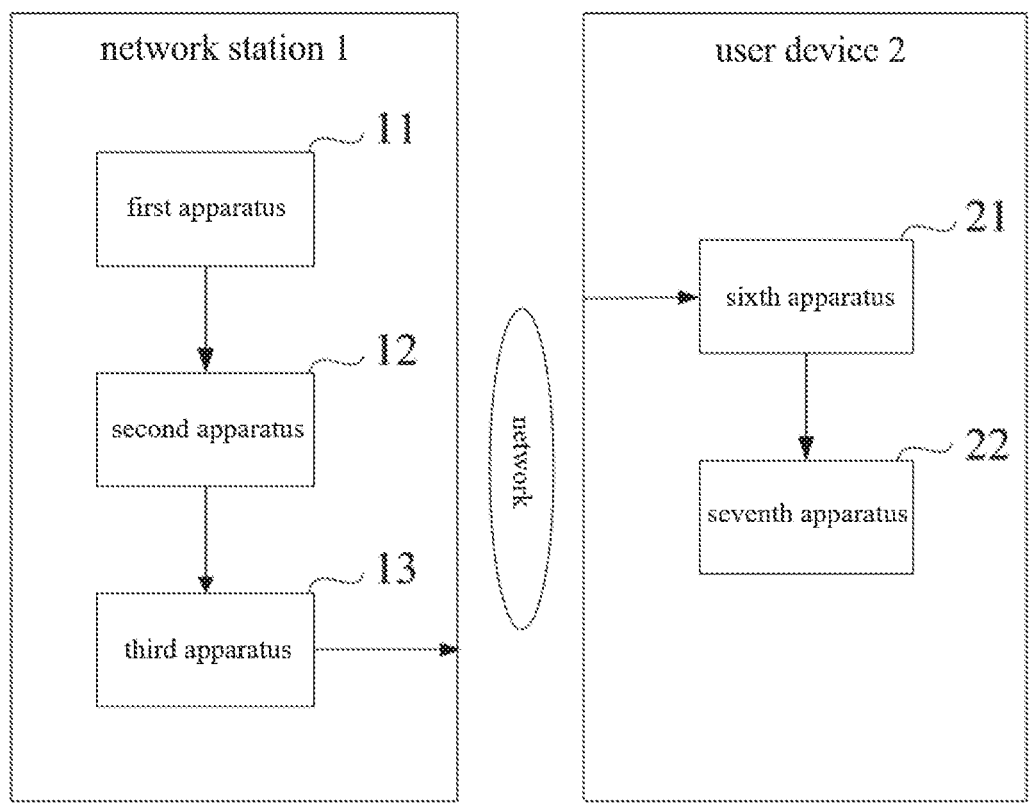
FIG. 3 shows a schematic diagram of a system for a user device to switch wireless connection between WAPs according to another embodiment of the present application.

FIG. 3 shows a schematic diagram of a system for a user device to switch wireless connection between WAPs. According to an aspect of the present embodiment, the system includes a network station 1 and a user device 2. The network station 1 cooperates with the user device 2 to accomplish the switch of WAPs.

The network station 1 may be but is not limited to a computer, a web host, a single web server, a cloud formed of a plurality of web server sets or servers. The cloud is formed of a large number of computers or network servers which perform cloud computing. The cloud computing is a kind of distributed computing performed by a virtual supercomputer composed of a group of loosely coupled computer sets. Preferably, the network station 1 stores relevant information of WAPs. The user device 2 may be various smart devices capable of implementing wireless connection function, such as a smart phone, a tablet and the like. The smart devices are driven with any operating system such as android or iOS.

The first apparatus 11 of the network station 1 obtains a target WAP for the user device 2 to connect later. The second apparatus 12 of the network station 1 determines the access information corresponding to the target WAP. The third apparatus 13 of the network station 1 sends the access information to the user device 2 via the network, i.e., the current wireless connection between the user device 2 and the currently connected WAP. Correspondingly, the sixth apparatus 21 of the user device 2 receives, via the current wireless connection, the access information corresponding to the target WAP sent by the network station 1. The seventh apparatus 22 of the user device 2 establishes wireless connection with the target WAP wireless connection based on the access information.

In this embodiment, the first apparatus 11 of the network station 1 obtains the target WAP. The WAP is an access point of wireless network which may be, but is not limited to, a wireless local area network following the standard protocols IEEE 802.11 series such as WiFi via Which the user device 2 can access the network. The target WAP refers to a WAP that the user device 2 is going to connect to. Specifically, the network station 1 obtains the connection process of the target WAP and the information of the user device 2 to obtain an appropriate target WAP based on preset rules. Preferably, the first apparatus 11 of the network station 1 further selects a target WAP to be connected according to the moving information of the user device 2, wherein the selection of the target WAP depends on the movement of the user device 2. Those skilled in the art can understand that WAPs are deployed in different geographical locations, and therefore, the selection is according to the geographical location of Which WAP that the user device 2 finally moves toward. Preferably, the moving information comprises the moving direction information of the user device 2, the moving speed information of the user device 2, the current location information of the user device 2, and the location of the currently-connected WAP information. Specifically, according to the moving direction information of the user device 2, the current location information of the user device 2 and the location information of the currently-connected WAP, multiple WAPs whose locations sit in the moving direction of the user device 2 may be selected and one of them closest to the user device 2 is taken as the target WAP.

The network station 1 further comprises a fifth apparatus for deriving the switching time information corresponding to the target WAP. The third apparatus 13 sends the access information and the switching time information to the user device 2 via the current network, in order for the user device 2 to establish wireless connection with the target WAP.

The fifth apparatus of the network station 1 derives the switching time information corresponding to the target WAP, wherein the switching time information is used to trigger the user device 2 to connect to the target WAR Preferably, the fifth apparatus derives the switching time information according to the coverage area information of the target WAP and the moving information. More specifically, the entry information indicating that the user device 2 enters the coverage area of the target WAP may be determined according to the moving direction information of the user device 2, the current location information of the user device 2, and the coverage area information of the target WAP. And the switching time information is determined according to the entry information and the moving speed information of the user device 2. For example, if the distance between the user device 2 and the border of the coverage area of the target WAP is 20 meters and the moving speed of the user device 2 is 5 meters/second according to the moving direction of the user device 2 and the coverage area of the target WAP, the switching time is derived as 4 seconds. In addition to the access information, this step S3 further includes sending the switching time information to the user device 2 via the current wireless connection for the user device 2 to establish wireless connection with the target WAP.

In the embodiment, the second apparatus 12 of the network station 1 determines the access information of the target WAR Those skilled in the art can understand that the network station 1 stores a large amount of the access information of WAPs. Therefore, the access information can be searched in the database of the network station 1 when the target WAP is found.

In the embodiment, the third apparatus 13 of the network station 1 sends the access information to the user device 2 via the current wireless connection for the user device 2 to establish wireless connection with the target WAP. The user device 2 is then able to receive the access information. Specifically, before the target WAP is connected to, the information exchange between the network station 1 and the user device 2 is performed via the current wireless connection based on the communication protocol of the current wireless connection. The access information comprises any one of the access password information corresponding to the target WAP, the access token information corresponding to the target WAP, and the available connection module information corresponding to the target WAP. The access information is used to establish wireless connection with the target WAP. Those skilled in the art should understand that different WAPs may correspond to different access approaches. Different access approaches correspond to different available connection module information which decides the access approach of the WAP, such as password authentication, token authentication, or other authentication methods. If the available connection module is not stored in the user device 2, the network station 1 needs to provide the available connection module information as well as the access information of the target WAP In the condition that the available connection module is already stored in the user device 2, the network station 1 only needs to provide the access information such as the access password information, the access token information or the access information of other authentication methods. For example, the WAPs using the password authentication can connect with the corresponding access password information. The access password information may be the password information or the account number plus the password information. Another example is that a WAP using token authentication, such as some operators' hot spots, may be connected based on the corresponding token information, or based on the mobile phone number and the dynamic verification code information, and the like.

Those skilled in the art should understand that the access approach is only exemplary. Other existing or future possible ways of establishing wireless connection with a WAP are applicable to the present application and should fall into in the scope of the present application.

Preferably, the network station 1 further comprises a fourth apparatus for detecting whether the user device 2 stores the access information. The third apparatus 13 sends the access information to the user device 2 via the current wireless connection when the user device 2 does not store the access information, so that the user device 2 is able to establish wireless connection with the target WAP. The network station 1 stores a lot of historical information for establishing connection between user devices and WAPs. Therefore, the access information for the user device 2 to establish wireless connection with the target WAP may be retrieved from the history information. More specifically, the network station 1 detects whether the user device 2 stores the access information by searching whether any data shows that the user device 2 ever established wireless connection with the target WAP in the history information database of the network station 1. For example, the search may be performed according to the serial number corresponding to the user device 2 and the model name of the target WAP. If the user device 2 ever established connection with the target WAP before, the access information is already stored in the user device 2. If the user device 2 does not store the access information, the third apparatus 13 sends the access information to the user device 2 via the current wireless connection.

In the embodiment, the seventh apparatus 22 of the user device 2 establishes wireless connection between the user device 2 and the target WAP according to the access information. Specifically, the user device 2 implements the wireless connection with the target WAP based on the access approach corresponding to the access information sent by the network station 1. For example, if the available connection module information of the target WAP is already stored in the user device 2, the seventh apparatus 22 of the user device 2 automatically loads the received access information into a corresponding location based on a preset protocol rule to implement the connection with the target WAP. If there is no available connection module information of the target WAP in the user device 2, the available connection module information needs to be transmitted to implement wireless connection with the target WAP.

Preferably, if there is a communication activity in the user device 2 via the current communication connection, the seventh apparatus 22 does not stablish wireless connection between the target WAP and the user device 2 until the communication activity finishes. The communication activity may be any information transmission activities performed in the user device 2 via the current wireless connection, such as download and upload of text, picture, audio, and video. The embodiment may continue to establish wireless connection with the target WAP after the communication activity is completed or ceased. Specifically, the way of not interrupting the current communication activity of the user device 2 may be implemented via a virtual private network (VPN) server. The VPN server assigns a virtual IP to the user device 2 to maintain the communication activity. Moreover, the network station 1 preferably selects an appropriate target WAP for the user device 2 according to the current communication activity. For example, if the user device 2 is performing a communication activity that requires high bandwidth, the network station 1 preferably selects a target WAP with relatively higher bandwidth. If the user device 2 is performing an application requiring high security such as online banking, the network station 1 preferably selects a target WAP with higher security.

Figure 4:
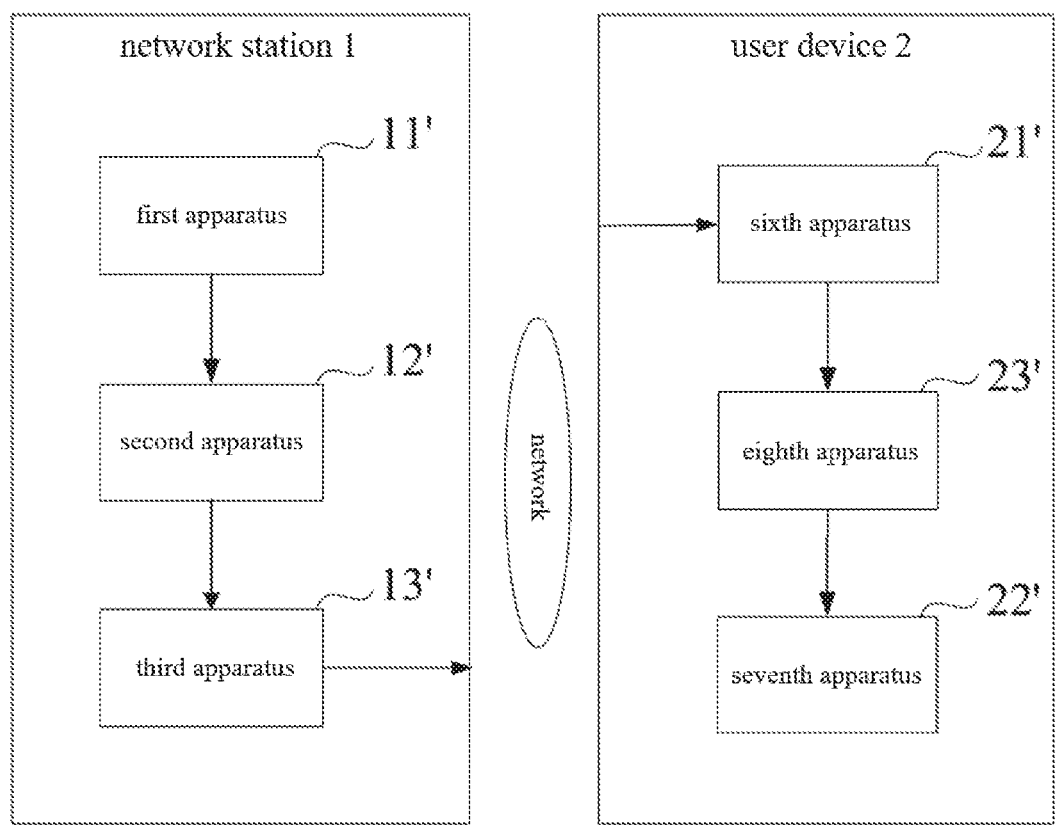
FIG. 4 shows a schematic diagram of another system for a user device to switch wireless connection between WAPs according to another preferred embodiment of the present application.

In a preferred embodiment as shown in FIG. 4, the first, second, and third apparatuses 11', 12', and 13' in FIG. 4 are the same or substantially the same as the first, second, and third apparatuses 11, 12, and 13 in FIG. 3. They are not be described in detail herein but are simply referred to. Preferably, the user device 2 further comprises an eighth apparatus 23' for detecting whether a trigger condition for switching to the target WAP is satisfied.

The seventh apparatus 22' further establishes wireless connection with the user device 2 and the target WAP according to the access information when the trigger condition is satisfied.

The eighth apparatus 23' of the user device 2 detects whether the trigger condition for switching to the target WAP is satisfied, wherein the trigger condition is used to trigger the user device 2 to connect to the target WAP. For example, if the signal strength of the currently-connected WAP is weak or the signal strength of the target WAP is strong enough to establish wireless connection, the user device 2 may be triggered to connect to the target WAP. Preferably, the trigger condition may be any one of the signal strength of the target WAP equal to or greater than a predetermined first signal strength threshold, the signal strength of the currently-connected WAP equal to or less than a predetermined second signal strength threshold, the signal strength of the target WAP equal to or greater than the signal strength of the currently-connected WAP, the switching time information corresponding to the access information being satisfied, and the access information being received by the user device 2.

Specifically, the trigger condition for triggering the user device 2 to establish wireless connection with the target WAP may be any one of the followings: (a) The signal strength of the target WAP is equal to or greater than a predetermined first signal strength threshold, wherein the first signal strength threshold is the lower limit signal strength suitable for establishing wireless connection with a WAP. The lower limit value is preset. When the user device 2 detects that the signal strength of the target WAP is equal to or greater than the predetermined first signal strength threshold, the user device 2 establishes wireless connection with the target WAP. (b) The signal strength of the currently-connected WAP is equal to or less than a predetermined second signal strength threshold, wherein the second signal strength threshold is an upper limit signal strength unsuitable for establishing wireless connection with a WAP. The upper limit value is also preset. When the user device 2 detects the signal strength of the currently-connected WAP is equal to or less than a predetermined second signal strength threshold, the user device 2 connects to the target WAP. (c) The signal strength of the target WAP is equal to or greater than the signal strength of the currently-connected WAP in this case, the user device 2 compares the signal strengths of the current and the target WAPs. The status that the signal strength of the target WAP is equal to or is greater than the signal strength of the currently-connected WAP indicates that the target WAP is more suitable for establishing wireless connection. (d) The switching time of the access information is satisfied. In this case, the user device 2 has received the switching time calculated by the network station 1, and the switch is triggered when the switching time is up. (e) The user device 2 receives the access information. Those skilled in the art may understand that the network station 1 may calculate and monitor the switching time corresponding to the access information. When the switching time is up, the network station 1 sends the access information to the user device 2 to enable the wireless connection between the user device 2 and the target WAP. Alternatively, the network station 1 and the user device 2 agree on the switching time in advance. After the user device 2 receives the access information, the user device 2 connects to the target WAP when the agreed switching time is up.

In contrast to prior art, the present embodiment illustrates that the network station obtains a target WAP for a user device to connect, determines the access information corresponding to the target WAP, and sends the access information to the user device via current wireless connection between the user device and the currently-connected WAP. The user device therefore may establish wireless connection with the target WAP. Correspondingly, the user device receives the access information, and establishes wireless connection with the target WAP according to the access information. In this way, automatic connection switch from the currently connected WAP to the target WAP is achieved. The access information is sent in advance via the current wireless connection between the user device and the currently-connected. WAP. The switching efficiency is improved. User devices may achieve automatic connection switch between WAPs especially on the move. In particular, compared with the connection switch technology by re-modeling WAPs or user devices, the present embodiment drastically reduces the energy consumption of the user devices, and ensures the feasibility of the implementation of the present embodiment. Moreover, due to security or privacy and other considerations, a WAP is usually unable to retrieve the access information of another WAP. The network station of the present embodiment performs the transmission of the access information. It avoids the potential safety hazard and also expands the scope of application.

Moreover, the present embodiment may also detect whether the user device stores the access information. When the user device does not store the access information, the access information is sent to the user device via the current wireless connection, so that the user device establishes wireless connection with the target WAP. The access information comprises any one of the followings: the access password information corresponding to the target WAP, the access token information corresponding to the target WAP, and the available connection module information corresponding to the target WAP. The amount of data transmission in the network station can be reduced thereby. For example, when the user device stores the access information, the network station does not need to send the access information any more. The embodiment detects whether the user device stores the access information of the target WAP in advance to ensure that the user device has retrieved the access information when it needs to establish connection with the target WAP without the user device requesting the access information. It has advantages of eliminating the delay resulting from requesting the access information, improving the efficiency of establishing wireless connection, saving time for establishing connection, and implementing user-senseless WAP switch.

If there is an existing communication activity in the user device via the current communication connection, the embodiment may start to establish wireless connection between the user device and the target WAPs after the communication activity finishes. The communication activities comprise all data transmission activities performed by the user device via the current wireless connection, such as download and upload of text, picture, audio, and video. The present embodiment may start to perform the switch of WAPs after the current communication activity is completed. The arrangement is to avoid interruption of the communication activity and to optimize communication efficiency and user experience.

It is apparent to those skilled in the art that the present application is not limited to the details of the above-mentioned exemplary embodiments. The present application may be embodied in other specific forms without departing from the spirit or essential characteristics of the present application. Thus, the above-mentioned exemplary embodiments are to be considered illustrative but not restrictive. The scope of the present application is indicated in the appended claims rather than in the above-mentioned description. All changes which come within the meaning and range of equivalency elements of the present application are to be viewed within the present application. In addition, the word "comprising" or "comprises" does not exclude other elements or steps, and the singular expression does not exclude the plural conditions. A plurality of elements stated in the apparatus claims may also be implemented by one elements. The first, second, and etc. terms are used to identify different components and do not represent any particular order.

What is claimed is:

1. A method for connecting a user device to a target wireless access point at a network station end, comprising:
   obtaining the target wireless access point from a plurality of wireless access points;
   determining access information corresponding to the target wireless access point;
   detecting whether the user device stored the access information; and
   sending the access information to the user device via current wireless connection between the user device and a currently-connected wireless access point for the user device to establish wireless connection with the target wireless access point when the user device does not store the access information.

2. The method of claim 1, wherein the access information comprises one of: access password information corresponding to the target wireless access point; access token information corresponding to the target wireless access point; and available connection module information corresponding to the target wireless access point.

3. The method of claim 1, wherein the target wireless access point is selected according to moving information of the user device.

4. The method of claim 3, wherein the moving information comprises:
 moving direction information of the user device; moving speed information of the user device; current location information of the user device; and location information of the currently-connected wireless access point.

5. The method of claim 3, further comprising a step of deriving switching time information corresponding to the target wireless access point, wherein the sending step further sends the switching time information to the user device via the current wireless connection for the user device to establish the wireless connection with the target wireless access point according to the switching time information.

6. The method of claim 5, wherein the deriving step is performed according to coverage area information of the target wireless access point and the moving information.

\* \* \* \* \*